Patented Mar. 30, 1926.

1,579,121

UNITED STATES PATENT OFFICE.

HANS KRZIKALLA AND HANS KÄMMERER, OF MANNHEIM, AND JOSEPH NÜSSLEIN, OF LUDWIGSHAFEN-ON-THE-RHINE, GERMANY, ASSIGNORS TO BADISCHE ANILIN & SODA-FABRIK, OF LUDWIGSHAFEN-ON-THE-RHINE, GERMANY, A CORPORATION OF GERMANY.

PRODUCING FAST DYEINGS ON WOOL.

No Drawing. Application filed August 3, 1925. Serial No. 47,969.

*To all whom it may concern:*

Be it known that we, HANS KRZIKALLA, HANS KÄMMERER, and JOSEPH NÜSSLEIN, citizens of the German Empire, residing the first and second at Mannheim, and the third at Ludwigshafen-on-the-Rhine, Germany, have invented new and useful Improvements in Producing Fast Dyeings on Wool, of which the following is a specification.

Our present invention relates to the production of fast dyeings on wool by a developing process similar to that employed for producing dyeings on cotton.

We have found that valuable dyeings can be produced on wool or other animal fibre by charging the same with a sulfonated dyestuff component, which component may contain hydroxy- or amino- or both hydroxy- and amino-groups enabling the component to be coupled with diazo compounds and then developing the charged fibre with a diazo compound. The component and the diazo compound must be so chosen as to give rise to an insoluble or difficultly soluble azo dyestuff not suitable for direct dyeing, and to this end they should contain only a very restricted number of sulfonic acid groups. The dyeings produced in this manner excel by a very good fastness and a great variety of shades.

The components to be brought unto the animal fibre may be of much different character; they may be aromatic or aliphatic sulfonated compounds which may contain other salt-forming groups, they may be colorless, colored or dyestuffs for themselves. Those of such components are of particular value which possess good affinity for animal fibre. The components to be developed may also be chrome dyestuffs possessing an amino- or hydroxyl-group enabling them to be coupled with a diazo compound, and such chrome dyestuffs may be coupled either in a chromed or non-chromed condition. By the after treatment with diazo compounds, the shades will become faster or deeper.

With the aid of the new process, mixed fabrics of animal and vegetable fibre can also be dyed.

The process is more fully explained by the following examples to which however the invention is not restricted.

*Example 1.*

Wool is boiled for one hour in a bath containing 3 per cent of bis-(2.3-hydroxy-naphthoyl-)-1.5-naphthylenediamine-di-sulfonic acid

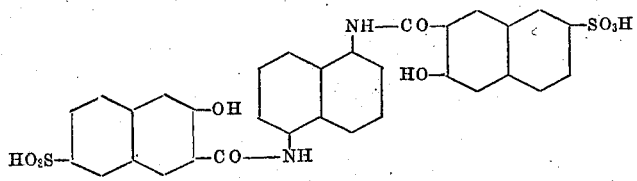

10 per cent of Glauber's salt, 4 per cent of dilute acetic acid and 10 per cent of nitre cake. In consequence of the strong affinity of the compound the bath is completely exhausted. The wool is then rinsed and developed in a slightly alkaline solution of diazotized meta-xylidine. A bluish red is produced excelling by a very good fastness to washing, milling and light.

*Example 2.*

Wool is boiled for an hour in a dye-liquor containing 3 per cent of 2.3.6-benzoyl-amino-hydroxy-naphthalene sulfonic acid, 10 per cent of Glauber's salt and 4 per cent of sulfuric acid; the wool is then rinsed and treated with a slightly ammoniacal solution of diazotized meta-xylidine. The red dyeings produced are very fast to light and milling. The dyestuff made from 2.3.6-benzoyl-amino-naphthol sulfonic acid and meta-xylidine, in substance, produces quite valueless dyeings.

*Example 3.*

The mono-azo dyestuff prepared by coupling, in an acid medium, diazotized alpha-naphthylamine and 1.8.5-amino-naphtholsulfonic acid, is dyed on wool in the usual way in an acid dye liquor. The wool is then rinsed and developed with a solution of diazotized mono-acetyl-para-phenylene-diamine made slightly alkaline with sodium carbonate. The dyeing produced thereby is a very solid black.

Other azo coloring matters with groups enabling coupling can be used in analogous way. For example, mono-azo dyestuffs obtained from diazotized aniline, ortho- or para-toluidine, para-anisidine, alpha-naphthylamine or para-nitraniline etc., and 1.8-amino-naphthol-4- or 5-mono-sulfonic acid or disazo-dyestuffs obtained from them by the action of unsulfonated diazo compounds may be employed and especially such azo dyestuffs as can more than once be coupled, for example the combination from diazotized 1.5-amino-naphthol and 1.8.4-amino-naphthol-sulfonic acid (coupled in acid medium), which when dyed on the animal fibre and developed, preferably with an alkaline diazonium salt solution, yields extraordinarily fast black shades.

*Example 4.*

The azo dyestuff from diazotized 5-nitro-2-amino-para-xylene and 2.8.6-amino-naphthol sulfonic acid is dyed on wool in a 3 per cent strength in the usual way. The wool is then rinsed and developed with a weakly alkaline solution of diazotized metaxylidine. A brown red dyeing, fast to washing and milling, is produced.

*Example 5.*

The mono-azo dyestuff obtained from ortho-amino-phenol-para-sulfonic acid and 1.5-dihydroxy-naphthalene is dyed and chromed as usual and then developed with diazotized meta-xylidine in an alkaline solution. A black shade is produced essentially deeper than that obtained by the simple chrome-dyeing. The dyeing, not chromed, may also be transformed into a fast black by developing it with a diazo solution.

*Example 6.*

Wool is dyed in the usual way in an acid solution with the mono-azo-dyestuff prepared from diazotized alpha-naphthylamine and 1.8.4-amino-naphthol-sulfonic acid in an acid or alkaline solution. The wool is rinsed and the dyestuff developed with diazotized dichloraniline. It is to be preferred to develop at a somewhat raised temperature and to neutralize the mineral acid by adding an acetate or bicarbonate. The resulting black shade is very fast to washing and milling.

The corresponding mono-azo-dyestuff obtained from 1.8.5-amino-naphthol sulfonic acid yields a still deeper black shade. The dyestuff obtained from diazotized 1-naphthylamine-5-hydroxy-7-sulfonic acid and meta-toluylene-diamine dyes the fibre brown shades fast to washing and milling after development with diazotized dichloraniline.

*Example 7.*

Half-wool is dyed in the usual manner with oxamine violet (see Schultz, Farbstofftabellen 1923, No. 326). After being washed it is developed with diazotized nitro-anisidine at 40 degrees to 50 degrees centigrade. The fibre is dyed violet brown shades very fast to washing and milling.

It is also possible to work in a modified manner by adding nitrosamine-sodium salt or a stable diazo salt to the acid-dyeing solution, after having dyed the fibre with the compound suitable for being coupled.

What we claim is:

1. The process of producing fast dyeings on animal fibre which consists in producing difficultly or not soluble azo dyestuffs in the animal fibre by charging the same with a sulfonated component that can be coupled and acting on the charged fibre with a diazo compound.

2. The process of producing fast dyeings on animal fibres which consists in charging the fibre with a sulfonated naphthalene derivative and acting on it with a diazo compound, the naphthalene and diazo compounds being so chosen that the azo dyestuff produced by their interaction is poor in sulfonic acid groups.

In testimony whereof we have hereunto set our hands.

HANS KRZIKALLA.
HANS KÄMMERER.
JOSEPH NÜSSLEIN.